United States Patent
Douglas

(10) Patent No.: US 6,413,139 B1
(45) Date of Patent: Jul. 2, 2002

(54) WHISTLE-TYPE DUCK WHISTLE

(76) Inventor: Wesley E. Douglas, P.O. Box 348, Los Banos, CA (US) 93635

( * ) Notice: Subject to any disclaimer, the term of this patent is extended or adjusted under 35 U.S.C. 154(b) by 0 days.

(21) Appl. No.: 09/549,347

(22) Filed: Apr. 14, 2000

(51) Int. Cl.$^7$ ................................................. A63H 5/00
(52) U.S. Cl. ........................................ 446/204; 84/330
(58) Field of Search ............................... 446/202, 204, 446/205, 206, 207, 208, 209, 397; 84/330, 380 R; 116/137 R

(56) References Cited

U.S. PATENT DOCUMENTS

| | | | |
|---|---|---|---|
| 3,750,521 A | * | 8/1973 | Dolmetsch ................ 84/380 C |
| 3,955,313 A | | 5/1976 | Faulk |
| 3,991,513 A | | 11/1976 | Faulk |
| 4,151,678 A | | 5/1979 | Robertson |
| 4,752,270 A | | 6/1988 | Morton |
| 4,888,903 A | | 12/1989 | Knight |
| 4,950,198 A | | 8/1990 | Repko |
| 5,230,649 A | | 7/1993 | Robertson |
| 5,564,360 A | * | 10/1996 | Wright .................... 116/137 R |
| 5,885,126 A | | 3/1999 | Carlson |
| 5,885,127 A | | 3/1999 | Colyer |

* cited by examiner

Primary Examiner—Jacob K. Ackun
(74) Attorney, Agent, or Firm—Richard A. Ryan

(57) ABSTRACT

A duck call for reproducing the sounds made by certain whistling ducks without having to flutter the tongue comprising a main body, a mouthpiece frictionally connected to the main body and a tubular roller disposed in a central sound chamber located in the main body of the whistle. Air blown by the user enters the open end of the mouthpiece and passes through an air vent on the mouthpiece into the central sound chamber. A slot formed at the interface of the end of the mouthpiece and an air vent in the main body creates a whistle sound that is directed into the sound chamber to rotate the tubular roller to produce the vibrato effect necessary to emulate the whistling-type ducks. A pair of side members having air chambers therein can be connected to the main body to create a larger resonant chamber in which the roller rotates. Apertures at the closed end of the side members can be open or closed by the user's fingers to selectively produce sounds that mimic other whistling-type ducks. The duck call can be made such that the components are frictionally connected so the call may be disassembled for cleaning. Alternatively, the duck call can be made as a single integral unit.

20 Claims, 4 Drawing Sheets

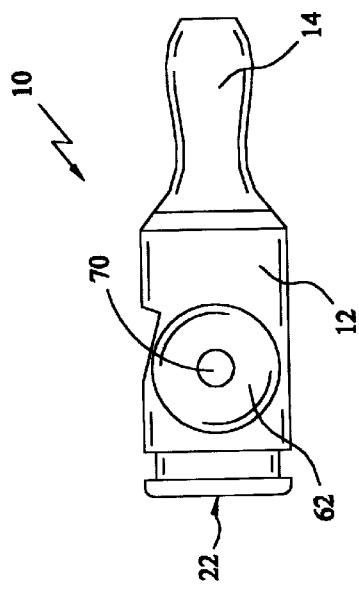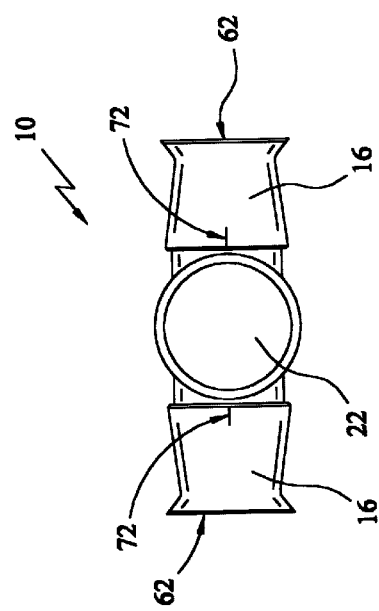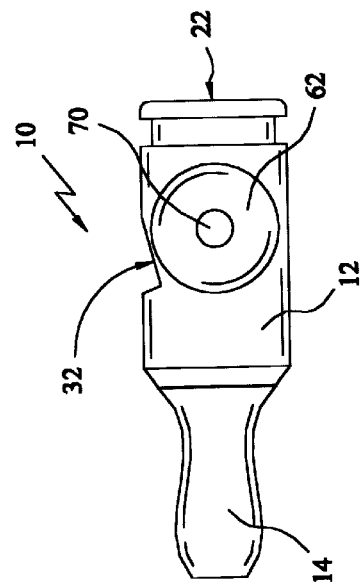

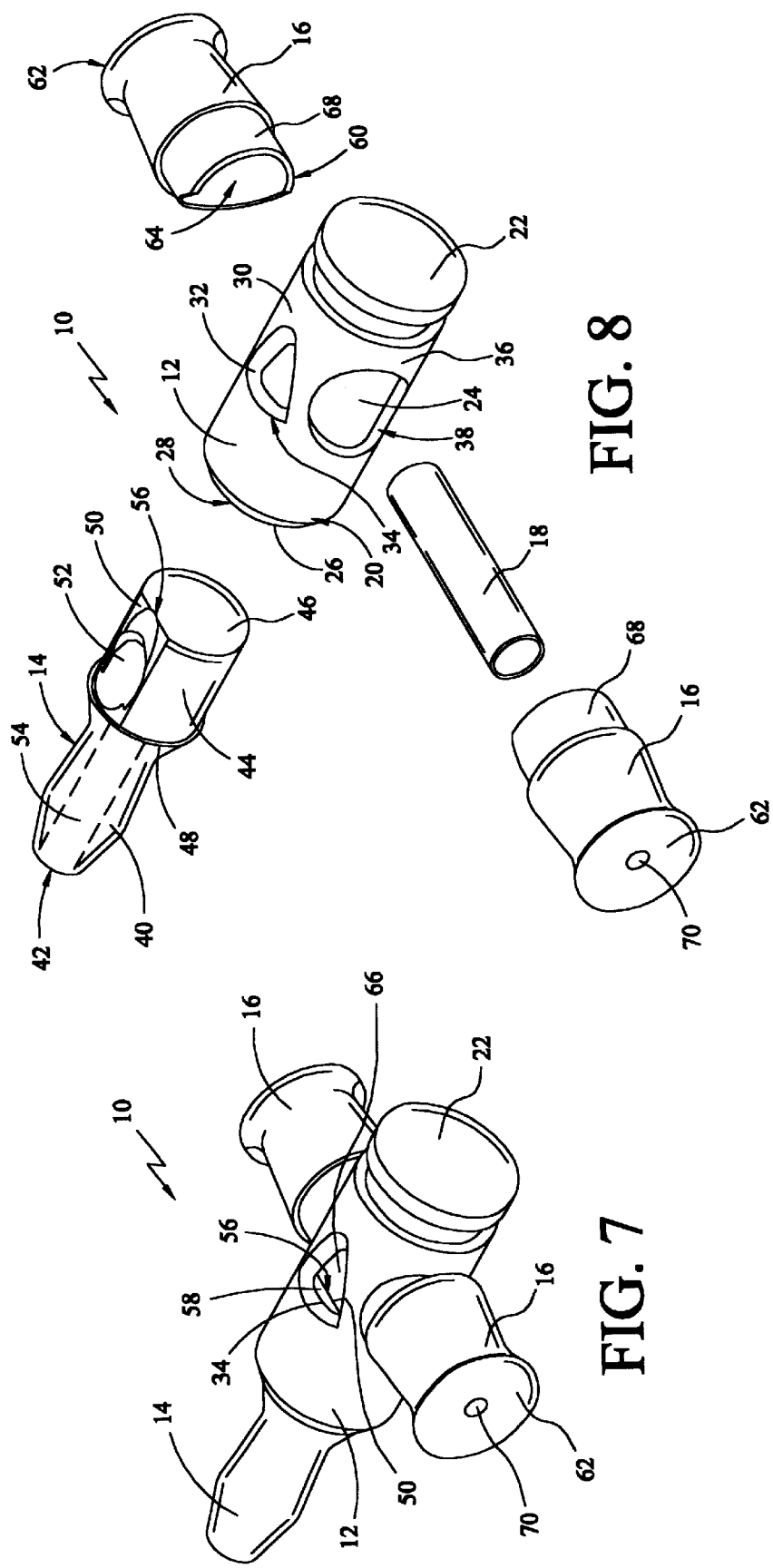

WHISTLE-TYPE DUCK WHISTLE

BACKGROUND OF THE INVENTION

1. Field of the Invention

The field of the present invention relates generally to manually operated, air-powered wild game callers used to attract waterfowl or game. In particular, the present invention relates to such wild game callers that create a whistling sound to attract waterfowl or animals. Even more particularly, the present invention relates to such callers that are used to mimic whistling-type ducks.

2. Background

Game calls are used by hunters, photographers and nature lovers to attract game or wildlife to the general vicinity near where the person using the call is located. Although there are many different types of game calls, they all generally have the same goal, which is to as realistically as possible mimic the sound of a particular animal or fowl. Some calls are designed to attract animals or fowl of the same type, such as those of the opposite gender. Other calls are intended to attract predators of the animal or fowl that the call is intended to mimic by leading the predator to believe that its natural prey is nearby. Naturally, if the call does not realistically mimic the sound made by the animal or fowl for which it is intended to simulate, then it will not be effective as a game call.

Game calls come in a variety of different types and configurations, often at least partially dictated by the sound required to mimic the particular animal or fowl for that game call. Generally, the three principal types of configurations for game calls consist of those made up of diaphragms, reeds or whistles. Diaphragm-type game calls typically utilize a vibratable rubber or rubber-like diaphragm stretched partially over an air passage opening such that the diaphragm vibrates upon the introduction of air into the air passage. An example of such a game call is disclosed in U.S. Pat. No. 4,950,198 to Repko. As noted by the inventor in that patent, diaphragm-type game calls are generally very difficult to effectively master in order to achieve the desired pitch, tone and modulation of a wildlife call.

The reed-type game calls, the most common type of game call, generally comprise a vibratory reed disposed inside an air passage or chamber. Air blown into the mouthpiece of this type of game call causes the reed to vibrate at a certain tone or pitch, creating a sound that is emitted from the outlet portion of the call. Some of the prior art reed-type game calls have multiple reeds and/or air passages that can be selectively opened or closed to simulate a variety of animal or fowl sounds. Others are suitable for producing the desired sound by utilizing a or closed to simulate a variety of animal or fowl sounds. Others are suitable for producing the desired sound by utilizing a sucking action at the mouthpiece. With regard to waterfowl, such as wild ducks, the reed-type game calls generally simulate the quacking sound emitted by ducks (typically the quacking sound is made by the female or hen duck). Examples of the reed-type of call are disclosed in U.S. Pat. No. 5,885,127 to Colyer, U.S. Pat. No. 4,888,903 to Knight, U.S. Pat. No. 4,752,270 to Morton, U.S. Pat. No. 4,151,678 to Robertson, and U.S. Pat. No. 3,991,513 to Faulk.

Whistle-type game calls are generally configured to simulate the whistling sound made by certain waterfowl, such as certain species of ducks. For instance, the Mallard drake (male) duck, as opposed to the Mallard hen (female), emits a buzz or hissing sound that is difficult to simulate with a reed or diaphragm-type game call. For other species of ducks, such as the Wood Duck, Pintail, American Widgeon and Greenwinged Teal, both the drake and hen make the whistling sound. Conventional whistles, such as safety and play whistles that utilize one or more balls or peas (typically made of cork, plastic or light weight metal) in a resonant chamber, do not adequately simulate the duck sound and, as such, are not suitable for use as game calls. U.S. Pat. No. 5,885,126 to Carlson and U.S. Pat. No. 5,230,649 to Robertson disclose game calls designed to be suitable for emulating the whistling sound made by the whistling ducks. produce different frequency and volume sounds. By the inventor's own description, the whistle of the Carlson patent requires proper technique to obtain the desired whistling duck sounds. The Robertson patent describes a duck call that has a resonant chamber around the sounding body and aligned vents to produce the whistling duck sound.

The typical whistle-type call suffers from several well known and inevitable problems. One problem particularly inherent with the ball-type of whistle is the accumulation of saliva and dirt in the resonant chamber and around the ball which can cause the ball to stick to the interior of the chamber. This results in loss of the vibrato effect or a undesirable reduction in the volume of sound emitted by the whistle. The reed-type whistles require the user to be able to flutter his or her tongue against the mouthpiece in order to modulate the air inflow through the whistle to produce the desired vibratory sound. What is needed, is a duck call that is easy to make and use which is capable of producing whistling sounds that closely emulate the sounds made by whistling type ducks.

SUMMARY OF THE INVENTION

The whistle-type duck call of the present invention solves the problems identified above. That is to say, the present invention provides a duck call that is relatively simple to use, inexpensive to manufacture and capable of producing sounds that closely simulate those made by certain whistling ducks. Specifically, the present invention discloses a duck whistle that does not require special skills, extensive effort or practice in order to effectively emulate the whistling sounds made by certain ducks.

In the preferred embodiment of the present invention, the duck call primarily comprises five main components: a main body, mouthpiece, a pair of side members and a tubular roller. The main body has a central sound chamber disposed between its ends. The mouthpiece connects to the open first end of the main body. A first air vent is located on the top side of the main body and is in fluid communication with the central sound chamber therein. Each side of the main body has an opening for tightly receiving one of the pair of side members, which in the preferred embodiment are truncated cylinders. The mouthpiece has a mouth portion for placement of the user's mouth on or against and a neck portion for tight insertion into the opening at one end of the main body. An air passage connects the open end of the mouth portion with a second air vent on the top side of the neck portion. The second air vent has a rearward edge located near the closed second end of the mouthpiece that forms a narrow slot at the interface with the forward edge of the first air vent. When attached to the main body, the air chambers of the side members form a resonant chamber with the central sound chamber of the main body. The tubular roller is disposed within the resonant chamber and is allowed to freely rotate therein in response to air passing through the slot. One or more apertures suitable for closure with the pad of the user's finger are in the closed second end of the side members to allow air to selectively flow out the resonant chamber. The tubular roller can be made plastic or other generally lightweight materials.

Preferably, the duck call of the present invention is made of separatable components that are frictionally connected together so the call can be disassembled for cleaning. In the alternative, the whistle can be made as a single integral unit or the components can be fixedly connected together. The duck call can be made out of various materials that provide a corrosion resistant, lightweight and sturdy call for use in the field. In use, the whistle is held in the hand and air is blown into the mouth portion of the mouthpiece. The air flows through the air passage and out the second air vent of the mouthpiece past the slot. The narrowness of the slot creates a whistle sound. After the air passes through the slot, it enters the resonant chamber and causes the roller to roll inside the resonant chamber. The rolling action of the roller creates the desired vibrato effect to emulate the sound made by whistling-type ducks without having to flutter the tongue. Different duck sounds can be emulated by covering one or more of the apertures at the second end of the side members.

Accordingly, the primary objective of the present invention is to provide a duck call that effectively emulates the sound made by whistling ducks.

It is also an important objective of the present invention to provide a duck call for whistling-type ducks that is easy to use without requiring difficult techniques or fluttering of the user's tongue to produce the whistle sound.

It is also an important objective of the present invention to provide a duck call that has a mouthpiece component connected to the main body for producing a whistling sound and for passing the whistling air into a resonant chamber in the body of the whistle with a tubular roller disposed in the chamber for producing the desired vibrato effect.

It is also an important objective of the present invention to provide a whistle-type duck call having a pair of side members with closeable apertures for selectively producing a variety of whistling duck sounds.

Yet another important objective of the present invention is to provide a whistle-type duck call that is relatively simple to make and suitable for disassembly and reassembly in order clean the duck call.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention:

FIG. 4 is a side view of the preferred embodiment of the present invention;

FIG. 5 is back view of the preferred embodiment of the present invention;

FIG. 6 is the other side view of the preferred embodiment of the present invention;

FIG. 7 is a perspective view of the preferred embodiment of the present invention;

FIG. 8 is an exploded view of the preferred embodiment of the present invention;

DETAILED DESCRIPTION OF THE PREFERRED EMBODIMENTS

Figure 3:
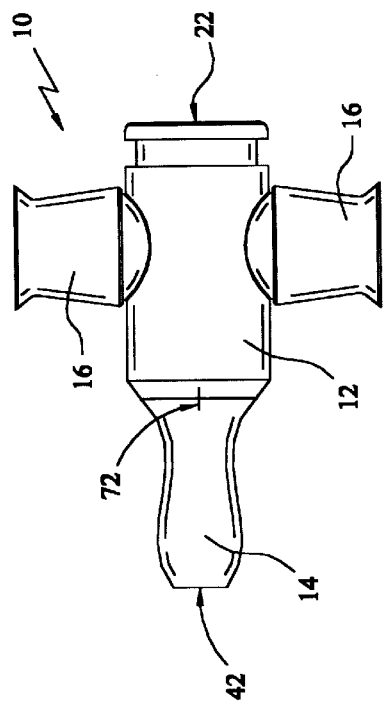
FIG. 3 is a bottom view of the preferred embodiment of the present invention.

With reference to the figures where like elements have been given like numerical designations to facilitate the reader's understanding of the present invention, and with reference to the embodiment of the present invention illustrated in FIGS. 1 through 10, the preferred embodiment of the present invention is set forth below. The duck call, designated generally as 10, primarily comprises main body 12, mouthpiece 14, a pair of side members 16 and tubular roller 18, as best shown in FIG. 8. Main body 12, which can be generally cylindrical in shape, has an open first end 20, an opposing closed second end 22 and a central sound chamber 24 disposed between first end 20 and second end 22. Open first end 20 has an abutting face 26 thereon and opening 28. Opening 28 is sized and configured to tightly receive mouthpiece 14. On the top 30 of main body 12 is located first air vent 32 in fluid communication with central sound chamber 24. First air vent 32 has at least a forward edge 34 located generally toward first end 20 of main body 12. Each of the opposing sides 36 of main body 12 have an opening 38 sized and configured to tightly receive a side member 16 therein. Although main body 12 is shown in the accompanying figures as a generally cylindrical member, the present invention is not so limited. Main body 12, first air vent 32 and openings 38 can be any shape or configuration suitable for obtaining the desired whistling sounds.

Figure 2:
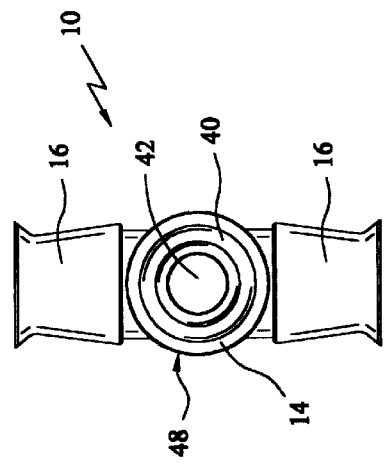
FIG. 2 is a front view of the preferred embodiment of the present invention.
Figure 1:
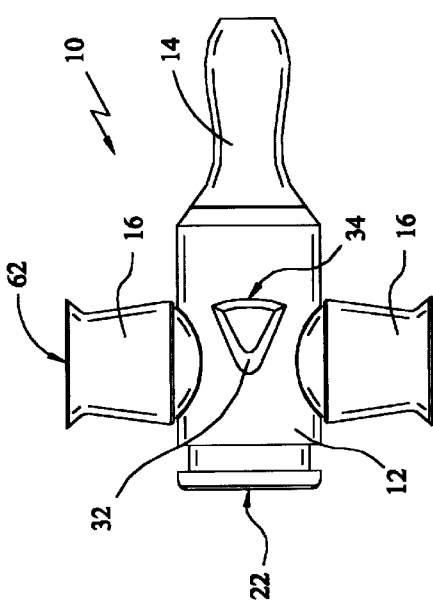
FIG. 1 is a top view of the preferred embodiment of the present invention.

As best shown in FIGS. 2 and 8, mouthpiece 14 is generally tubular shaped having a mouth portion 40, with an open first end 42, and a neck portion 44 with a closed second end 46. Mouth portion 40 of mouthpiece 14 can be tapered or otherwise configured for comfortable placement of the user's lips on or around mouthpiece 14 and for receiving air blown into the duck call 10 from the user. Neck portion 44 of mouthpiece 14 is sized and configured for tight insertion into open first end 20 of main body 12. Disposed between mouth portion 40 and neck portion 44 is shoulder 48, of generally larger diameter than neck portion 40, configured to abut against abutting face 26 of main body 12 and sealably close open first end 20 of main body 12 to prevent air escaping therefrom. The top side 50 of neck portion 44 has a second air vent 52 that is in fluid communication with first end 42 of mouthpiece 14 via air passage 54 disposed lengthwise inside mouthpiece 14 (as shown by hidden lines in FIG. 8). Second air 20 vent 52 has at least a rearward edge 56 located on the side of air vent 52 nearest the closed second end 46 of mouthpiece 14. As shown in FIG. 8, the top side 50 of neck 44 is flattened, thereby creating a non-circular second end 46. A relatively narrow slot 58, as shown in FIG. 7, is formed at the interface of forward edge 34 of first air vent 32 in main body 12 and rearward edge 56 of second air vent 52 in mouthpiece 14 to allow air from air passage 54 to pass into central sound chamber 24.

Figure 10:
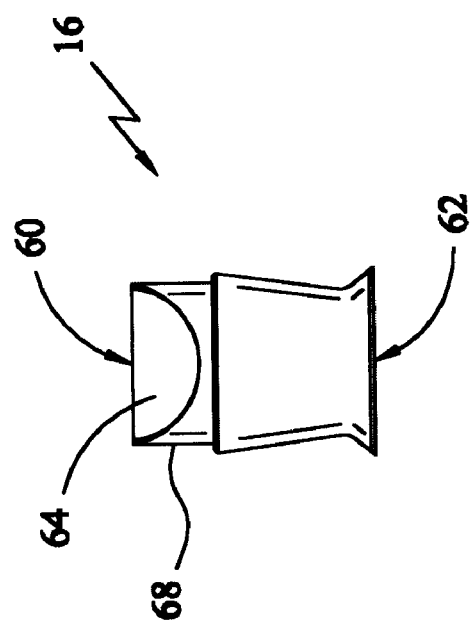
FIG. 10 is a front view of the truncated cylinder of the preferred embodiment of the present invention illustrating the shaped first end thereof.
Figure 9:
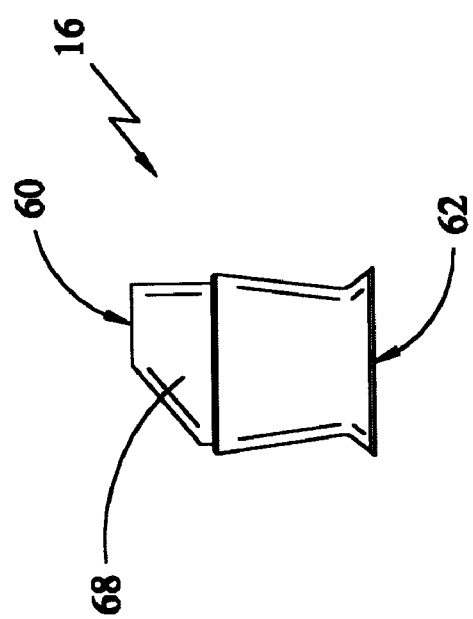
FIG. 9 is a side of the truncated cylinder of the preferred embodiment of the present invention.

As best shown in FIGS. 1–3 and 7–8, in the preferred embodiment each of side members 16 are generally tubular and have an open first end 60, an opposing closed second end 62 and an air chamber 64 disposed between the first 60 and second 62 ends. When attached to main body 12, side members 16 protrude from main body 12 and first end 60 opens into central sound chamber 24 such that the air chambers 64 of side members 16 and the central sound chamber 24 form a cylindrical resonant chamber 66. Open first end 60 of side member 16 is located on shaped neck portion 68 of side member 16. Neck portion 68 is sized to tightly fit into openings 38 on the sides 36 of main body 12 to sealably close openings 38. Neck portion 68 is shaped and configured, as shown in FIGS. 8–10, to not restrict the movement of air or the roller 18 in resonant chamber 66. The preferred embodiment of the present invention 10 also includes an aperture 70, as shown in FIGS. 4 and 6–8, in second end 62 of each side member 16 that is in fluid communication with resonant chamber 66 to allow air to flow out resonant chamber 66. Aperture 70 should be suitable for sealably closing with the pad of the user's finger so as to prevent air from flowing out aperture 70 when desired. The open or closed condition of aperture 70 allows the user to selectively produce more than one type of whistling sound. If desired, second end 62 can have more than one aperture in order to allow the user to selectively produce an even greater variety of whistling sounds.

Tubular roller 18 is disposed within resonant chamber 66 such that it is permitted to freely rotate in response to the introduction of air through slot 58. Tubular roller 18 should be made out of plastic or other generally lightweight material and be sized and configured to freely rotate within resonant chamber 66 in response to the introduction of air therein through the slot 58.

In the preferred embodiment, the duck call 10 of the present invention is made of separate components that are frictionally connected together to form call 10. Such a construction allows the user to disassemble duck call 10 to clean the components as may be necessary. To assist with proper reassembly, duck call 10 should contain a number of matching position markers 72, as shown in FIGS. 3 and 5, on the components to facilitate properly re-configuring the whistle 10 together. Alternatively, the whistle 10 can be made as a single integral molded unit, such as being made from injection molded polystyrene or the like or from stamped or molded metal or shaped wood. If made into separate components, the components can be fixedly connected by sonic welding, glueing or through other connecting methods appropriate for the material that was used to make the whistle. Duck call 10 can be made out of various materials that are suitable for use in the outdoors under field conditions (i.e., should be corrosion resistant, lightweight and strong enough not to be too fragile).

In use, the person wanting to simulate the call of a whistling duck merely holds whistle 10 in his or her hand and blows air into mouth portion 40 of mouthpiece 14. The air will flow into air passage 54 and out second air vent 52 of mouthpiece 14 through slot 58 formed at the interface of rearward edge 56 of second air vent 52 and forward edge 34 of first air vent 32. The narrowness of slot 58 creates a whistle sound that emanates from first air vent 32, the tone and pitch of which is dependant upon the configuration of first air vent 32 and the size of slot 58. As the blown air passes through slot 58, it enters resonant chamber 66 where it encounters roller 18 and causes roller 18 to roll or rotate around the roller's longitudinal axis inside resonant chamber 66. The rolling action of roller 18 creates the desired vibrato effect that is necessary to emulate the sound made by whistling-type ducks without the need to flutter the person's tongue or utilize difficult to master blowing skills. By covering one or more of apertures 70 at second end 62 of side members 18 with the pad of the user's fingers, the user can obtain different sounds to emulate different types of whistling ducks.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A duck call, comprising:
   a main body having a central sound chamber disposed therein and a first air vent thereon in fluid communication with said central sound chamber;
   a generally tubular roller disposed in said central sound chamber, said roller able to freely rotate within said central sound chamber;
   a mouthpiece connected to said main body, said mouthpiece having an open first end for receiving air, a closed second end and an air passage in said mouthpiece, said second end of said mouthpiece disposed in said main body near said first air vent;
   a second air vent in said mouthpiece near said second end of said mouthpiece, said second air vent in fluid communication with said air passage and said central sound chamber; and
   a slot formed at the interface of said second end of said mouthpiece with said first air vent, whereby said slot produces a whistling sound when air is introduced into said first end of said mouthpiece and passes through said second air vent into said central sound chamber.

2. The duck call according to claim 1 further comprising a pair of side members protruding from said main body, each of said side members having an open first end, an opposing closed second end and an air chamber disposed therebetween, said first end of said side members open into said central sound chamber of said main body such that each of said air chambers is in fluid communication with said central sound chamber to form a resonant chamber.

3. The duck call according to claim 2, wherein said roller is disposed in said resonant chamber so as to freely rotate therein.

4. The duck call according to claim 2, wherein each of said side members have a shaped neck portion at said first end of said side members, each of said neck portions inserted into a side opening in said main body.

5. The duck call according to claim 2, wherein said side openings are on opposite sides of said main body.

6. The duck call according to claim 2, wherein said side members are formed integral with said main body.

7. The duck call according to claim 2, wherein said side members are frictionally attached to said main body.

8. The duck call according to claim 2 further comprising an aperture in each of said closed second ends of said side members.

9. The duck call according to claim 2, wherein said first air vent has a forward edge thereof, said slot formed at the interface of said forward edge of and said second end of said mouthpiece, said slot in fluid communication with said central sound chamber to cause said roller to rotate.

10. The duck call according to claim 1, wherein said main body further comprises an open first end and a closed second end, said central sound chamber disposed between said first end and said second end of said main body.

11. The duck call according to claim 10 further comprising an abutting face on said open first end of said main body and a shoulder circumferentially disposed around said mouthpiece, said shoulder on said mouthpiece abutting said abutting face of said main body to sealably connect said mouthpiece to said main body.

12. The duck call according to claim 1, wherein said mouthpiece frictionally connects to said main body.

13. A duck call, comprising:
   a main body having an open first end, a closed second end and a central sound chamber disposed therebetween, said first end having an abutting face thereon;
   a first air vent in said main body, said first air vent in fluid communication with said central sound chamber, said first air vent having a forward edge thereof;
   a generally tubular roller disposed in said central sound chamber, said roller able to freely rotate within said central sound chamber;
   a mouthpiece connected at said first end of said main body, said mouthpiece having a mouth portion for receiving air and a shaped neck portion for insertion into said first end of said main body, said mouthpiece further comprising an open first end on said mouth portion, a closed second end on said neck portion and an air passage in said mouthpiece, said second end of said mouthpiece disposed in said main body near said first air vent;
   a second air vent in said neck portion of said mouthpiece, said second air vent in fluid communication with said air passage; and
   a slot formed at the interface of said second end of said mouthpiece with said forward edge of said first vent.

14. The duck call according to claim 13 further comprising a pair of side members extending from said main body, each of said side members having an open first end, an opposing closed second end and an air chamber disposed therebetween, each of said air chambers in fluid communication with said central sound chamber to form a resonant chamber, said roller disposed in said resonant chamber so as to freely rotate therein.

15. The duck call according to claim 14, wherein said side members have a shaped neck portion at said first end, each of said neck portions of said side members inserted into an opening in said main body.

16. The duck call according to claim 14, wherein said side members are formed integral with said main body.

17. The duck call according to claim 14 further comprising an aperture in each of said closed second ends of said side members.

18. A duck call, comprising:
   a main body having a central sound chamber disposed therein and a first air vent thereon in fluid communication with said central sound chamber;
   a pair of opposing side openings in said main body;
   a pair of side members protruding from said main body, each of said side members having an open first end with a shaped neck portion, an opposing closed second end and an air chamber disposed therebetween, each of said neck portions inserted into one of said pair of opposing side openings in said main body, said first end of said side members open into said central sound chamber of said main body such that each of said air chambers is in fluid communication with said central sound chamber to form a resonant chamber;
   a generally tubular roller disposed in said resonant chamber, said roller able to freely rotate within said resonant chamber;
   a mouthpiece connected to said main body, said mouthpiece having an open first end for receiving air, a closed second end and an air passage in said mouthpiece, said second end of said mouthpiece disposed in said main body near said first air vent;
   a second air vent in said mouthpiece near said second end of said mouthpiece, said second air vent in fluid communication with said air passage and said central sound chamber; and
   a slot formed at the interface of said second end of said mouthpiece with said first air vent, whereby said slot produces a whistling sound when air is introduced into said first end of said mouthpiece and passes through said second air vent into said central sound chamber.

19. The duck call according to claim 18 further comprising an aperture in each of said closed second ends of said side members.

20. The duck call according to claim 18, wherein said side members and said mouthpiece are frictionally attached to said main body.

* * * * *